United States Patent
Hamlin

(10) Patent No.: US 6,724,982 B1
(45) Date of Patent: Apr. 20, 2004

(54) DIGITAL AUDIOVISUAL MAGNETIC DISK DOUBLY LINKED LIST RECORDING FORMAT EXTENSION TO MULTIPLE DEVICES

(75) Inventor: Christopher L. Hamlin, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 897 days.

(21) Appl. No.: 09/585,804

(22) Filed: May 31, 2000

(51) Int. Cl.[7] .............................. H04N 5/85; H04N 5/781
(52) U.S. Cl. ...................................... 386/125; 386/126
(58) Field of Search .............................. 386/125, 124, 386/126, 105, 106, 82, 69, 70, 68, 45, 40, 46, 1; 711/112, 100, 154, 217, 111; H04N 5/85, 5/781

(56) References Cited

U.S. PATENT DOCUMENTS 5,345,347 A      9/1994 Hopkins et al.
5,909,700 A  *  6/1999 Bitner et al. ................. 711/162
6,499,083 B1 * 12/2002 Hamlin ......................... 711/112

OTHER PUBLICATIONS

IEEE Standard P1394 "High Performance Serial Bus", Nov. 21, 1995, Draft 8.0v4, New York.

* cited by examiner

Primary Examiner—Robert Chevalier
(74) Attorney, Agent, or Firm—Milad G. Shara, Esq.; Burns Doane Swecker & Mathis

(57) ABSTRACT

Exemplary embodiments of the present invention are directed to a data storage device and associated method for reproducing a stored data stream with at least one data storage media having addressable storage locations storing data segments and pointers. The data segments define the stored data stream, and the pointers indicate addressable storage locations for other segments in the stored data stream. Each pointer includes a field for identifying whether the data stored includes the addressable storage location of the segment indicated by the pointer. A controller is responsive to the data segments for reproducing a stored data stream in accordance with an autonomously-defined sequence determined by the pointers.

19 Claims, 4 Drawing Sheets

DIGITAL AUDIOVISUAL MAGNETIC DISK DOUBLY LINKED LIST RECORDING FORMAT EXTENSION TO MULTIPLE DEVICES

BACKGROUND OF THE INVENTION

1. Field of the Invention

The present invention generally relates to a digital audiovisual magnetic disk doubly linked list recording format extension to multiple devices for recording, playing and otherwise manipulating streaming data. In particular, the invention is directed to coordinating data transfer activities among multiple streaming drives or disk-based storage systems that can support both streaming functionality and conventional random block I/O functionality.

2. Background Information

Disk drives are known that can support both conventional random block input/output (I/O) and streaming I/O. For example, disk-based storage is described in U.S. patent application Ser. No. 09/397,152 filed Sep. 15, 1999 entitled DISK-BASED STORAGE SYSTEM RESPONSIVE TO A DIRECTION-SELECTION SIGNAL FOR AUTONOMOUSLY CONTROLLING SEEKS IN A SEQUENCE DETERMINED BY THE DIRECTION-SELECTION SIGNAL AND A LOCALLY-STORED DOUBLY LINKED LIST and in U.S. patent application, Ser. No. 09/515,275, filed Feb. 29, 2000 entitled METHOD FOR PROCESSING FILE SYSTEM SERVICE REQUESTS IN A COMPUTER HAVING AN ATTACHED DISK DRIVE THAT CAN REPRODUCE STREAM DATA AND NON-STREAM DATA, the disclosures of which, along with the disclosure of IEEE Standard 1394 "High Performance Serial Bus", are hereby incorporated by reference in their entireties.

When writing to or reading from a disk based storage system, operating systems typically service file allocation service requests from an application program utilizing a file allocation structure of the operating system known as a file allocation table (FAT). In general, there are two main types of file allocation service requests. Conventional input/output (I/O) block requests to read or write data asynchronously, and streaming I/O operations and requests to read or write data isochronously.

Streaming data can represent items of a temporal nature such as audiovisual (A/V) data, musical data (e.g. MP3 data), video on demand, networked video, or any other continuous data. Streaming data can also represent data structures that are inherently linear sequential data structures. Inherently linear data structures must be sequentially processed and accessed. These data structures are contrasted with non-streaming data that can be randomly accessed for processing with no inherent access order dependency.

Conventional I/O block requests are asynchronous because they can be nonconsecutive requests which occur randomly. This is in contrast to streaming I/O requests that are associated with a particular stream of data and are received consecutively so that the continuity of a stream can be preserved when the stream is written into or read from memory. Preserving the continuity of data is important in video applications to present smooth visual imagery to the observer without creating any jitter or perceptible discontinuities in the data presented to the user.

Some of the difficulties and associated inefficiencies in handling streaming data can be attributed to the fact that file systems used in conventional operating systems were not specifically designed to support disk drives and other storage media for accommodating streaming behavior. Despite this, there is a desire to efficiently accommodate streaming data, and it is commercially unacceptable to treat a streaming drive as an exclusively streaming resource within a computing system because of the desire to have a single disk drive support the entire computer system that is sold to a customer.

Conventional operating systems, and the applications they support, support named entities such as files and objects. Disk drives deal in blocks of data, with one or more blocks being associated with a particular file or object. The file system of an operating system establishes a one-to-one correspondence between the named entities and a logical set of storage blocks on the disk drive having an associated logical block address (LBA). A disk drive is typically viewed as a succession of sequential blocks, moving from a first block to a last block. The operating system can perform I/O requests using LBAs, while the disk drive operates in relation to its own physical space and translates the logical block address into a physical address, such as a head/cylinder/sector (HCS) address. Therefore, the file management system of a conventional operating system faces a difficult task when it must handle streaming I/O data, because it must simultaneously deliver as many streams of data as possible with no error, while minimizing the latency of the data. This task is compounded when the disk storage media is configured as a disk-based storage system having multiple disk media (e.g. multiple disk media).

Accordingly, it would be desirable to efficiently process file system service requests for both isochronous and asynchronous applications, particularly when the disk storage media includes multiple disk media. It would also be desirable to achieve this without having to modify existing file systems.

SUMMARY OF THE INVENTION

Exemplary embodiments of the present invention are directed to a data storage device and associated method for reproducing a stored data stream with at least one data storage media having addressable storage locations storing data segments and pointers. The data segments define the stored data stream, and the pointers indicate addressable storage locations for other segments in the stored data stream. Each pointer includes a field for identifying whether the data stored includes the addressable storage location of the segment indicated by the pointer. A controller is responsive to the data segments for reproducing a stored data stream in accordance with an autonomously-defined sequence determined by the pointers.

According to exemplary embodiments the at least one data storage media includes plural rotating disk media, and the controller includes plural controllers, each of which is associated with one of the plural rotating disk media. The data storage media can support aggregated streaming and is extensible and scalable up to a bandwidth of an isochronous interconnect of the plural controllers.

Exemplary embodiments include a data storage media that includes a doubly linked list of pointers to autonomously control a plurality of separate rotating disk media while providing a continuous stream of data. Exemplary embodiments can be scaled to any number of separate disk media.

Exemplary embodiments can interconnect multiple disk media using an IEEE Standard 1394 interface, or using a Fibre Channel bus interface.

Exemplary embodiments can use a storage media that can support at least one of an asynchronous data transfer and isochronous data transfer.

According to exemplary embodiments, the data segments constitute video data that can be stored and retrieved using a plurality of interconnected drives.

Exemplary embodiments can use a data sequence that possesses a data field format comprising a head pointer and a tail pointer.

Exemplary embodiments can use an addressable data location that comprises at least one tag field that autonomously directs the controller to move from one storage media to another storage media. For example, a plurality of tags can be used to create a tree structure. Different tags can be used to denote different data paths and a heuristic algorithm can be used to determine which path a particular operation should take.

The controller can be phase locked loop (PLL) based controller.

Exemplary embodiments can store duplicate data segments in two or more separate locations on a storage media.

Exemplary embodiments can provide a data storage device as an object in an object oriented environment.

Exemplary embodiments include data storage media that implements and supports a database construct, such as standard query language (SQL).

DETAILED DESCRIPTION OF THE PREFERRED EMBODIMENTS

Figure 1:
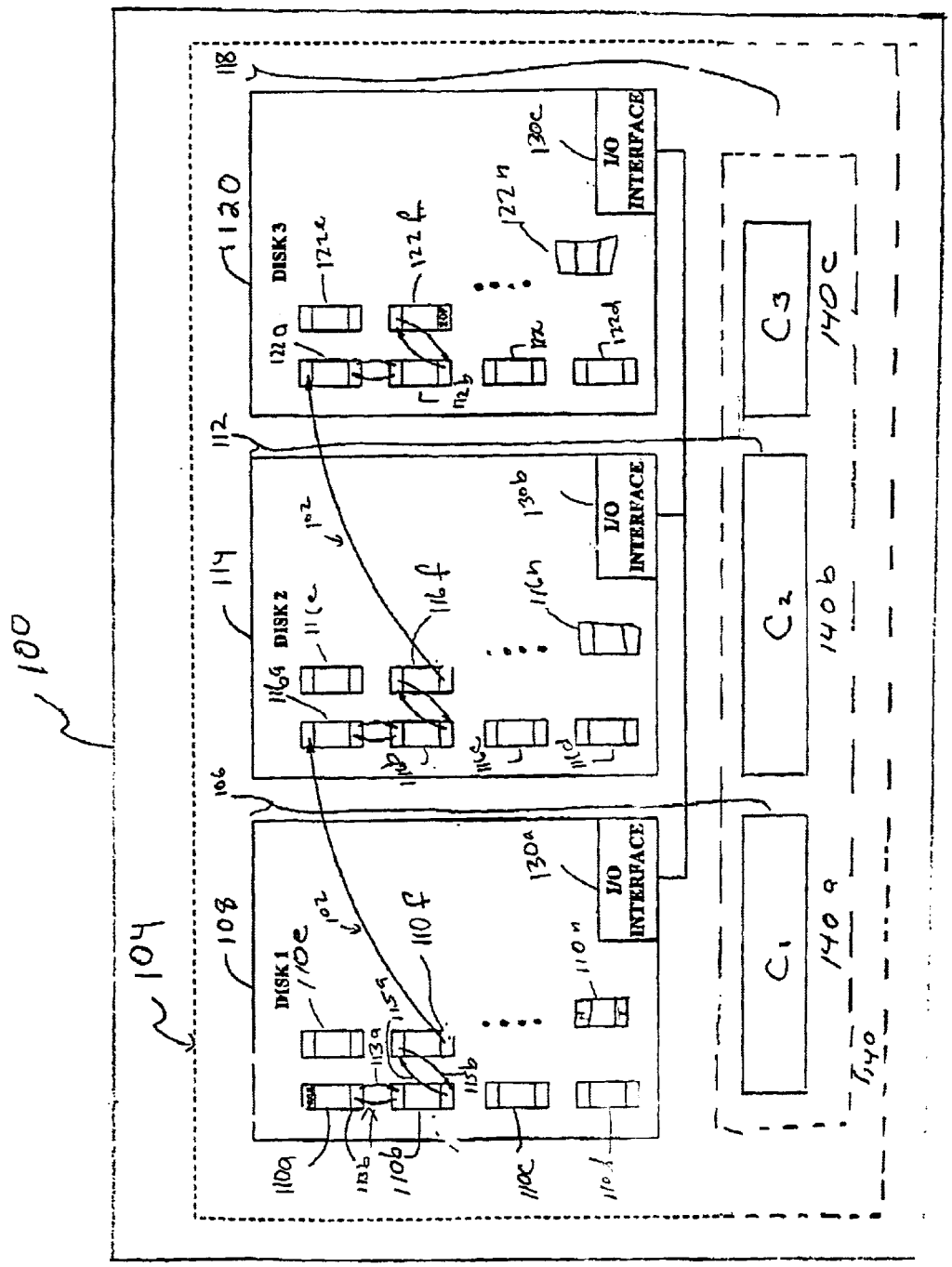
FIG. 1 is a block diagram of a data storage device according to an exemplary embodiment of the present invention for reproducing a stored data stream using a disk media having multiple storage disks, with data segments being linked by head and tail directed pointers.

FIG. 1 shows a data storage device 100 for reproducing a stored data stream 102. The data storage device includes at least one data storage media represented in FIG. 1 as a disk based storage system 104 having multiple disk drives 106, 12 and 118. The term "disk-drive" encompasses disk drives having industry-standard interfaces such as IDE, SCSI, 1394, and so forth, including head disk assemblies ("HDA's") and the associated control electronics that comprise a disk-drive structure. The disk drives are connected to their respective controllers 140a–c through their corresponding I/O interfaces 130a–c. The controllers can be separate from each other, or they can be combined into an overall controller 140.

The disk based storage system 104 includes a plurality of addressable storage locations that can be considered a plurality of blocks each having a data segment and pointer, the data segments defining a continuous data stream. For example, the disk drive 106 includes a disk media 108 having data segments 110a to 110f, the disk drive 112 includes a disk media 114 having data segments 116a to 116f, and the disk drive 118 includes a disk media 120 having data segments 122a to 122f. In accordance with exemplary embodiments of the present invention, any or all of the data segments can be used to define a data stream 102. In the FIG. 1 example, data segments 110a, 110b, 110f, 116a, 116b, 116f, 122a, 122b, and 122f are shown to constitute a continuous data stream 102.

Pointers are included with each of the data segments to indicate addressable storage locations for other segments in the stored data stream, each pointer including a field for identifying whether the data storage media includes the addressable storage location of the segment indicated by the pointer. In FIG. 1, the top portion of each data segment is shown to contain a head pointer and the bottom portion of the data segment is shown to contain a tail pointer. As an example, on disk media 108, pointer 113a connects the tail of data segment 110a to the head of data segment 110b, while pointer 113b connects the head of data segment 110b to the tail of data segment 110a. The rest of the data segments that form an entire data stream are connected through this head and tail pointer linkage arrangement. For example, the plurality of interconnected disk drives have data segments linked by a doubly-linked list of pointers. This arrangement can support aggregated streaming of data and is extensible and scalable up to the bandwidth of the isochronous interconnect.

When a given data segment includes both head—and tail-directed pointers, the data segment is said to be "doubly linked". There are other descriptive terms that can be used to represent the use of reference addresses associated with data to define a sequence of digital data within a data stream. The pointers may be used in other capacities. For example, the pointers may be used to denote a predetermined location or address within the media which is not relative to the data segment with which the pointer is associated, such as a fixed location storage address within the media. Alternatively, the pointers may be used to reference addresses associated with a data segment which does not immediately precede or follow the data segment with which the pointers are associated, such as referring to a data segment further "upstream" or "downstream." Many other alternate uses and configurations of pointers are possible. The pointers may be pre-recorded prior to writing of the payloads of data to the media, dynamically generated and recorded during write operations, or some combination.

The term "address" as used herein refers to any reference which provides for identifying the storage location (physical or logical) of data on the disk media. For example, an address could comprise a physical location reference (such as a head, sector, cylinder address), a logical transformation of the physical address, or a relative offset address.

The doubly-linked list of pointers is stored in the disk media. A predetermined set of such doubly-linked lists of blocks that are arranged in a manner so as to minimize the latency required to move back and forth among the members is termed a braid. The recording medium may be pre-formnatted by writing in suitable pointer values to accommodate any number of streams up to the limit, determined by such factors as the buffer size and worst-case latency of the specific HDA design. The encoding within each data segment of a formatted, rotating media using a pointer to the predecessors of a specific block and the successors of a specific block can be considered similar to a Lissajous Braid.

The blocks on the disk are numbered in a single linear sequence. The Lissajous Braid entails encoding within each block of a rotating medium a pointer that points to that particular blocks predecessor block (a block found ahead the target block) and a successor block (a block found after the target block). In this way, the drive can correctly traverse an arbitrary linear sequential stream of data autonomously, without requiring external assistance from a computer file system and its associated maps and directories.

The present invention extends this idea to any combination of multiple storage devices or drives and can be interconnected with conventional communication protocols. A particular encoding of data or a tag associated with the pointer field(s) for predecessor or successor blocks is set aside as representing a reference whose physical scope lies outside the immediate device. For example, two disk drives can be coupled together by a serial interface such as Fibre Channel or IEEE Standard 1394. A serial bus protocol stack that is used in a IEEE Standard 1394 implementation is a well known method of coupling and synchronizing drives and controllers. This protocol can support asynchronous data transfer, synchronous data transfer, and/or both asynchronous and isochronous data transfer simultaneously.

Upon encountering a forward or backward pointer reference containing this tag, the firmware is alerted that this particular reference is applied to a block that is not on this particular device, but rather on another device that is connected via the serial interconnect.

In one embodiment, at least one of the tag bits associated with each pointer is defined to indicate whether a pointer refers to a different disk drive. The tag structure found in IEEE Standard 1394 can be modified to accommodate the linked list of pointers.

Upon encountering a pointer (whether forward or backward) containing a tag indicating another disk drive, the firmware for the originating drive responds to this information to signal the other remote disk drive to locate and transmit where directed the data segment which was the object of the pointer. The disposition of the data segment pointed to is specified by the pointer. The tag field within the pointer contains a bit that flags the controller to jump to the associated disk drive or storage media that contains the data segment that is next in the data stream.

In alternate embodiments, additional tag bits can be used to indicate where the data should be conveyed. For example, the remote drive can convey the data segment directly to the buffer of the originating drive, or provide the data over its own interface or a common I/O interface to the requesting resource.

As an example, the I/O interface used can be a IEEE Standard interface or a Fibre Channel bus interface. Those skilled in the art will understand that other interfaces can be used for interconnecting the drives.

Each of the multiple disk drives 106, 112 and 118 has an I/O interface over which streaming (or other) data reproduced in accordance with the autonomously defined sequence directed by the pointers is provided. The disk drives can be extended and scaled to autonomously control a plurality of separate rotating disk media while providing a continuous stream of data. This arrangement allows different types of data (such as video data) to be stored, retrieved and managed on either a local drive or on a plurality of interconnected drives. In an alternate embodiment, only one disk connects to the I/O interface, and acts as a master for the remaining disks in a disk array format.

The first data segment 110a of the first disk drive 106 is linked via the head/tail directed pointers 113a, 113b to the second data segment 110b, and that is linked to a third data segment 110f. The last data segment of the first disk drive 106 is linked by the former's tail directed pointer to a first data segment on the second disk drive 112. In turn, this first data structure is linked to a second data structure on the second disk drive 112, and so forth. In this fashion, a logical channel or data stream is formed using data segments which can be physically located on different disk drives.

A controller is responsive to the data segments for reproducing a data stream in accordance with an autonomously-defined sequence determined by the pointers. Any type of modified or unmodified controller can be used, including a phase locked loop (PLL) based controller. In the FIG. 1 example, the controller includes a separate controller (140a–c) for each of the disk drives, and each of these controllers can be configured as described in U.S. Pat. No. 5,345,347, the disclosure of which is hereby incorporated by reference in its entirety.

Figure 2:
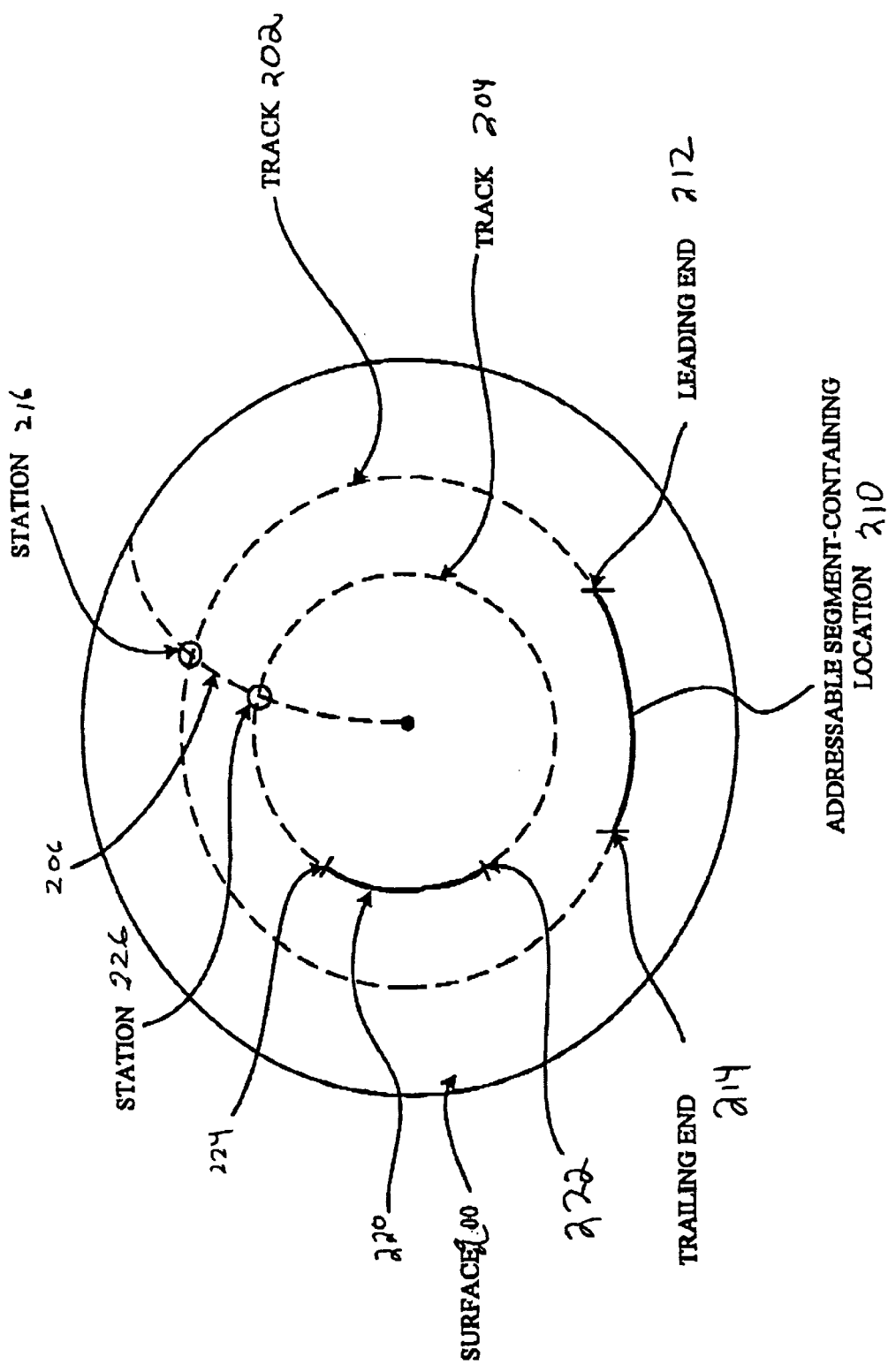
FIG. 2 is a schematic representation of a disk-media recording surface and shows a first track including an addressable location, a second track including another addressable location and illustrates the leading end and trailing end of addressable locations.

FIG. 2 provides more detail regarding the addressable data storage locations. In FIG. 2, a disk media recording surface 200 has a multiplicity of tracks including a first track 202 and a second track 204. An arc 206 shown by a dashed line represents a locus of points above which an associated head of a head stack assembly travels as an actuator rotates relative to a pivot axis.

Track 202 includes an addressable location 210 that revolves around the center of disk rotation in a counter-clockwise direction as viewed in FIG. 2. The addressable location 210 includes a leading end 212 and a trailing end 214. While the associated head is positioned at the point on arc 206 indicated as station 216, a data segment stored in addressable location 210 can be read starting when its leading end 212 reaches a conjunction with station 216 and continuing until its trailing end 214 passes station 216. Similarly, track 204 includes an addressable location 220 having a leading end 222 and a trailing end 224. While the associated head is positioned at the point on arc 206 indicated as station 226, a data segment stored in addressable location 220 can be read starting when its leading end 222 reaches conjunction with station 226. In the case illustrated in FIG. 2, each addressable location is entirely contained within a single track, whereby the associated head remains at the same station throughout the reading of a complete data segment. In the case of an embedded servo disk drive, the data segment can be interrupted by servo wedges. Also, a data segment can be defined in chunks with one chunk on one recording surface and another chunk on another recording surface, in which case a head switch operation would be autonomously provided. Additionally, duplicate data segments can be stored in two or more separate locations on a data storage segment to improve latency by providing the closes data segment to a read head at a given time during a data access operation.

Figure 3:
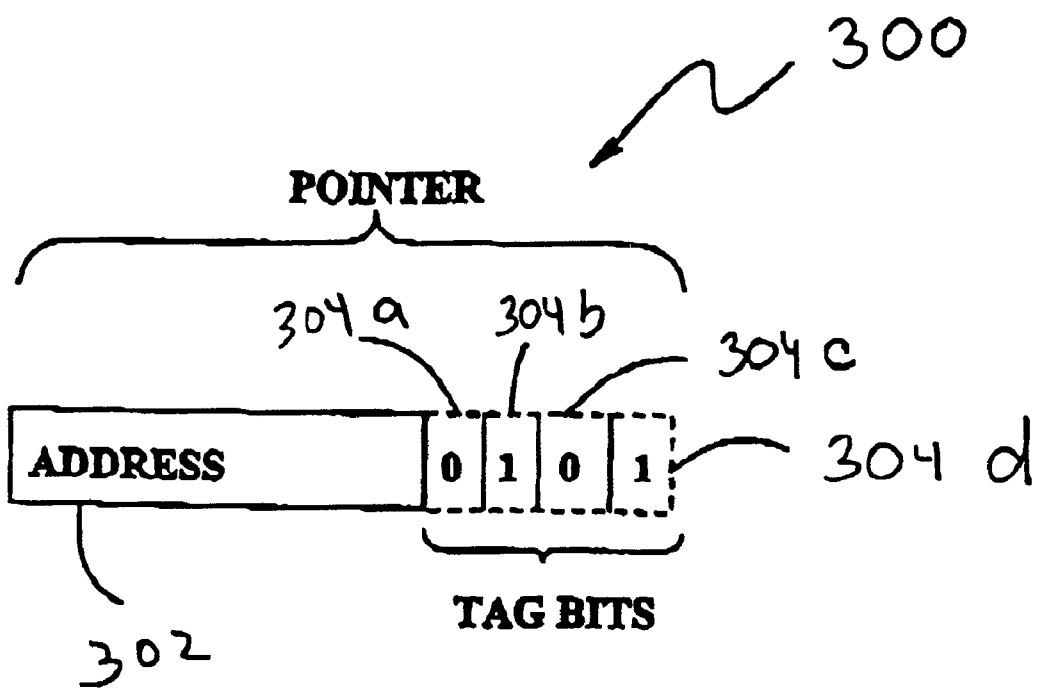
FIG. 3 is a graphical representation of an exemplary format for a data structure comprising head and tail directed pointers.

FIG. 3 illustrates an exemplary pointer structure. In FIG. 3, each pointer 300 comprises an address field 302 and one or more tag bits 304a–d. The tag fields are used to autonomously direct a controller to move from one storage media to another storage media. A tag field from IEEE Standard 1394 can be defined in accordance with the present invention to modify the data packets to include the pointer address information. The IEEE Standard 1394 protocol can support data fields up to and greater than 16 bits.

The IEEE Standard 1394 Serial Bus interface provides connectionless acknowledged data transfer services between a source node and a destination node. In the link layer the basic protocol data unit (PDU) is the packet and its corresponding acknowledge is defined in this standard as a "subaction". There are two types of subactions: asynchronous and isochronous. Isochronous subactions have a "guaranteed" access to the available bus bandwidth, while asynchronous subactions use the remaining bandwidth. Asynchronous actions are appropriate for applications that do not require a guaranteed high bandwidth, low latency, or a precise timing reference. Isochronous actions are appropriate where a guaranteed high bandwidth, low latency, or a precise timing reference are required.

It is the responsibility of the isochronous resource management process to guarantee that adequate bus bandwidth remains for asynchronous use. Asynchronous arbitration is used whenever a link layer wants to send data packets as soon as possible. This prevents the present invention is extensible up to the maximum bandwidth of the isochronous interconnect. Those skilled in the art will realize that other interconnect protocols can be used to implement the present invention.

While one address field is shown in FIG. 3, the tag bits may be disposed in any relationship to the address field 302, or in the alternative, they may be disposed at different locations. There are many permutations and variants possible with this arrangement in using the tags to autonomously direct a controller to move from one storage media to another storage media. The paths chosen can be optimized or based on predetermined algorithms, such as a heuristic algorithm. The tags are also used to define a tree structure for the system.

The tag directs the controller to a location in memory (e.g. a local memory associated with the controller) which can match the various pointer address ranges with their associated disk drives. In an alternative embodiment, the address information can be considered part of the tag and pointer data field and directly identify the disk drive to be accessed.

The address field 302 comprises a head, cylinder, sector (H,C,S) address, although other address formats may also be used. The tag bits 304a–d are individual binary data bits that function as flags to indicate various conditions relating to individual data segments. Tag bits in the present embodiment include (i) a first bit 304a indicating that the data segment associated with the pointer is used for streaming data; (ii) a second data bit 304b indicating that the pointer in which the tag is embedded is a head-directed pointer or a tail-directed pointer; (iii) a third tag bit 304c to indicate a null or EOF (end of field) pointer; (iv) a fourth bit 304d used to indicate that the pointer relates to data associated with another HDA (such as an embodiment having multiple HDA's); and (v) a tag bit indicating that the data segment associated with the pointer is used for streaming, but is empty. The number and placement of tag bits for the pointer is variable, and multiple other conditions may be indicated by the tag bits (such as the use of logical data segment addressing). In general, sufficient tag bits are used to make the pointer self-describing. This facilitates the autonomous operation of the drive directed by the pointers.

Thus, the tag would be used to invoke a process whereby the remote device would be signaled to locate and transmit, in the direction stipulated, the block which was the object of the pointer in question. The particular disposition of the block would also be specified by the form of the pointer field involved. The block could be conveyed immediately via the interconnect to the local buffer resource in the originating drive, or the block can be forwarded to a predetermined remote consumer or sink whose identity has been established prior to the inception of the transfer operation.

This way of implementing parallel transfers affecting substantial numbers of devices can be initiated simultaneously and still exercise autonomy or independence from external computing resources.

In a configuration including a group of conforming drives, the set of participating members can be enumerated up to some reasonable limit (e.g. 1024) without reference to the topology in which they were connected. Various organizations and topologies can be used, such as ring, tree, and mesh, provided that they are consistent with the interconnect requirements of the equipment. In the case of high bandwidth interconnects like Fibre Channel or gigabit Ethernet, this would permit coordinated high bandwidth parallel transmission.

For more complex operations, such as non-linear editing, higher-level application software and an object directory would be required to complete the process. However, the high level application would be greatly simplified by virtue of the stream format predefined on the set of drives used to record the associated streams.

Figure 4:
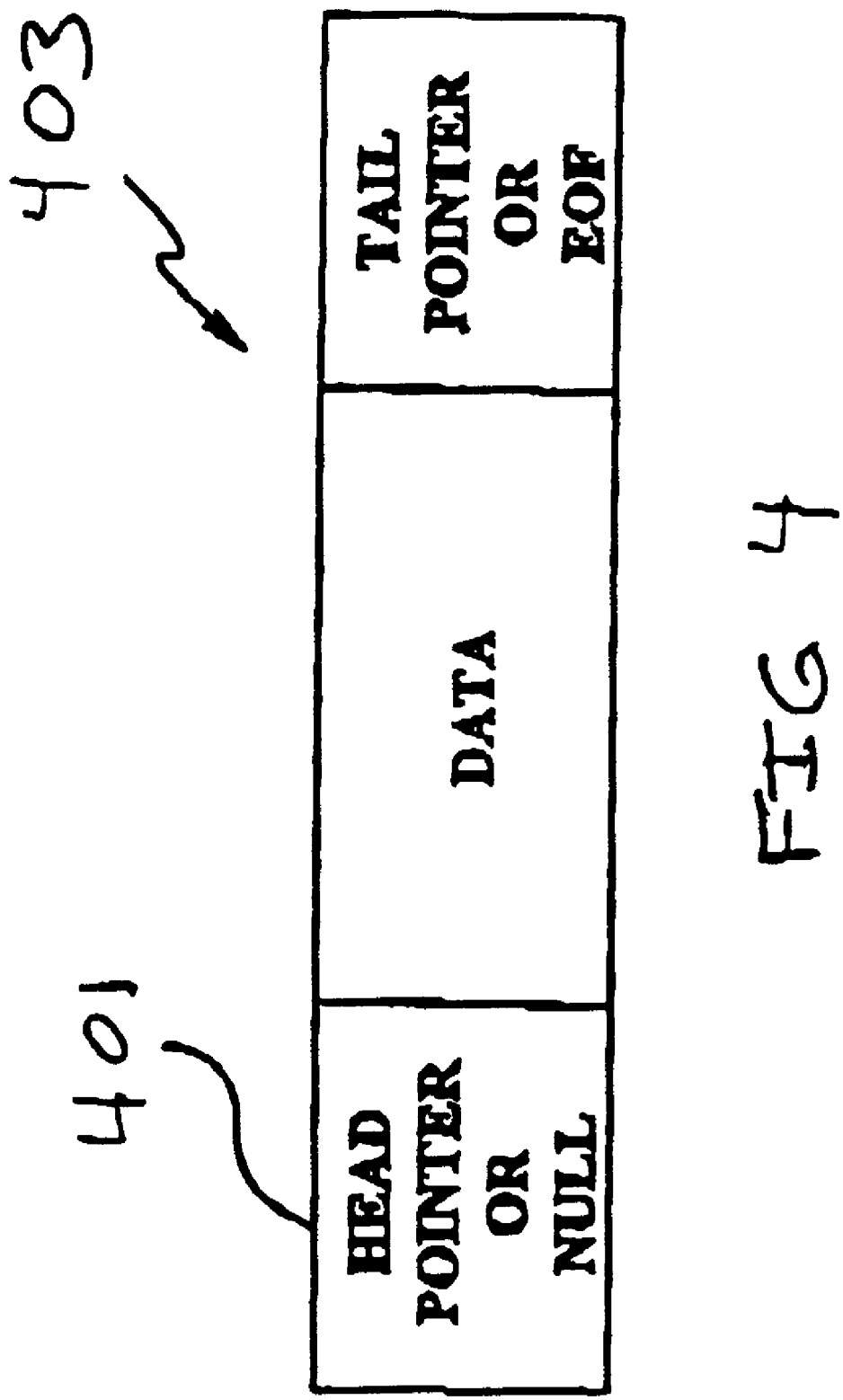
FIG. 4 is a graphical representation illustrating the use within an exemplary data structure of head and tail directed pointers having null or end of field values.

FIG. 4 shows the use of null or EOF values 401 within the pointer fields (or data segments) of the data structures. A null pointer is used when the data segment associated with the pointer is the first data segment within a defined data stream or sequence, or portion thereof. Similarly, a tail or EOF value 403 is used when the associated data segment comprises the last data segment within the data stream. The controller responds to such data segments in accordance with their indications.

The NULL pointer shown in the first data segment of FIG. 1, indicates that it is the first data segment in the stream. No other data segments precede this first data segment in this particular stream. Similarly, the EOF pointer of the last illustrated data segment 122f precedes no other structures in the particular stream. Hence, by using the NULL and EOF pointers, the boundaries of the data stream are readily defined. This allows successive data segments in a digital data stream to be disposed at any physical location on the surface of the disk media. Data segments of various data streams can be allocated among the multiple disk drives to fall within particular constraints regarding latency from one data segment to the next. This is particularly advantageous if multiple streams are being read from or written to the disk media simultaneously. However, those skilled in the art will appreciate that the data structures can be arranged physically on the media surface in any fashion. Furthermore, the streamed digital data can optionally be written to only certain head, sector and cylinder addresses in order to "partition" the disk drive for other types or origins of data. In the example previously described, the synchronous streaming data may be physically partitioned from the asynchronous host data by restricting the streamed data to certain cylinders, such as cylinders 1 through n.

The individual disk media need not be of the same type or construction. For example, the first media could comprise a multi-disk rotating disk drive unit, the second a single disk rotating disk drive unit, and the third another type of device. However, in one embodiment for independent disk drive units, the controllers are programmed to cooperate together in passing control from drive to drive, or to operate in a master slave configuration. Advantageously, the individual controllers operate using the autonomous pointer linked list operations. Alternatively, a single controller is configured to control all the drive units.

This permits the parallel transfers affecting substantial numbers of devices to be initiated simultaneously, while maintaining autonomy from external computing resources. In large configurations, the conforming drives and the participating drives are provided without reference to the topology of the connection. In this manner, a ring, tree, or mesh organization may be accommodated. Even for complex operations, such as non-linear editing, which may require high level application software to control the process, these operations are simplified by the stream format described above on the set of drives.

There are several basic approaches or methods of implementation of appropriate data structures in conjunction with a doubly-linked list methodology. These include: (i) head and tail-directed pointers stored in a random access memory within the disk drive; (ii) pointers stored in data areas on the rotating disk media; and (iii) pointers stored in the servo wedge areas or similar areas of the disk media. The term "data structure" refers to the combination of a "payload"—i.e., a data segment, and its associated pointers. However, the term data structure does not require physical proximity between the data segments and associated pointers.

A modified controller and/or protocol can also be developed to parse the tag and extract an appropriate data flow sequence corresponding to a particular stream. The controller can use the tag to direct itself to the appropriate spindle on the data storage media. The controller can support an asynchronous protocol, an isochronous protocol, or both. The controller can be a standard 1394 controller or a modified 1394 controller. It can also be a phase locked loop (PLL) based controller.

In programming the implementation of the present invention, the power of object oriented design methodologies can be used. For example, the data storage media can be set to be an "object" in an object oriented source code environment. The data storage media also lend themselves to implementing and supporting a database construct such as standard query language (SQL).

The present invention can be extended to numerous operational scenarios where streaming data, or any other data, is involved, including, but not limited to camcorder applications, television applications, multimedia applications or any adapter that uses data.

What is claimed is:

1. A data storage device for reproducing a stored data stream, the device comprising:
   at least one data storage media having addressable storage locations storing data segments and pointers, the data segments defining the stored data stream, and the pointers indicating addressable storage locations for other segments in the stored data stream, wherein each pointer includes a field for identifying whether the data storage media includes the addressable storage location of the segment indicated by the pointer; and
   a controller responsive to the data segments for reproducing the stored data stream in accordance with an autonomously defined sequence determined by the pointers.

2. The device of claim 1, wherein the at least one data storage media includes plural rotating disk media, and the controller includes plural controllers, each of which is associated with one of the plural rotating disk media.

3. The device of claim 1, wherein the data storage media can support aggregated streaming and is extensible and scalable up to a bandwidth of an isochronous interconnect of the plural controllers.

4. The device of claim 1 where the data storage media includes a doubly linked list of pointers scaled to autonomously control a plurality of separate rotating disk media while providing a continuous stream of data.

5. The device of claim 1, wherein the data storage media is scalable to include any number of disk drives.

6. The device of claim 1 where the data storage media is interconnected using at least one of an IEEE standard 1394 interface and a Fibre Channel bus interface.

7. The device of claim 1, where the data storage media can support at least one of asynchronous data transfer and isochronous data transfer.

8. The device of claim 1, wherein the data segments constitute video data that can be stored and retrieved using a plurality of interconnected drives.

9. The device of claim 1, where the data segments possess a data field format comprising a head pointer and a tail pointer.

10. The device of claim 9, wherein at least one head pointer is a null pointer.

11. The device of claim 9, wherein at least one tail pointer is an end of the field pointer.

12. The device of claim 1, where an addressable data location comprises at least one tag that autonomously directs the controller to move from one storage media to another storage media.

13. The device of claim 12, where a plurality of tags are used to define a tree structure.

14. The device of claim 12, where different tags are used to denote different data paths and a heuristic algorithm determines which path a particular operation should take.

15. The device of claim 1, where the controller is a phase locked loop based controller.

16. The device of claim 1, where duplicate stored data segments are stored in two or more separate locations on a data storage media.

17. The device of claim 1, where the data storage media is an object in an object oriented environment.

18. The device of claim 1, where the data storage media can implement and support a database construct.

19. The device of claim 18, wherein the database construct is a standard query language (SQL).

* * * * *